(12) United States Patent
Huang et al.

(10) Patent No.: US 11,356,300 B2
(45) Date of Patent: Jun. 7, 2022

(54) SOUNDING REFERENCE SIGNAL CONFIGURATION FOR SUPPORTING VIRTUAL AND NON-VIRTUAL PORT SOUNDING

(71) Applicant: QUALCOMM Incorporated, San Diego, CA (US)

(72) Inventors: Yi Huang, San Diego, CA (US); Gokul Sridharan, Sunnyvale, CA (US); Yan Zhou, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 16/947,282

(22) Filed: Jul. 27, 2020

(65) Prior Publication Data

US 2021/0036895 A1    Feb. 4, 2021

(30) Foreign Application Priority Data

Aug. 2, 2019    (GR) .............................. 20190100335

(51) Int. Cl.
*H04L 25/20* (2006.01)
*H04L 25/02* (2006.01)
(Continued)

(52) U.S. Cl.
CPC ....... *H04L 25/0226* (2013.01); *H04B 7/0456* (2013.01); *H04B 7/0695* (2013.01); *H04L 5/0051* (2013.01); *H04W 72/042* (2013.01)

(58) Field of Classification Search
CPC . H04L 25/0226; H04L 5/0051; H04L 5/0094; H04L 25/0204; H04L 25/0228;
(Continued)

(56) References Cited

U.S. PATENT DOCUMENTS 10,057,916 B2 *   8/2018   Barabell .............. H04B 17/318
11,070,400 B2 *   7/2021   Tang ................... H04B 7/0617
(Continued)

OTHER PUBLICATIONS

"3rd Generation Partnership Project; Technical Specification Group Radio Access Network; NR; Physical Layer Procedures for data (Release 15)" 3GPP Standard, Technical Specification, 3GPP TS 38.214, 3rd Generation Partnership Project (3GPP), Mobile Competence Centre, 650, Route Des Lucioles, F-06921 Sophia-Antipolis Cedex, France, No. V15.5.0, Mar. 27, 2019 (Mar. 27, 2019), pp. 1-103, XP051722951, Sections 6.2.1, 6.1.1.2.
(Continued)

*Primary Examiner* — Helene E Tayong
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive an indication of a sounding reference signal (SRS) configuration that identifies an SRS resource set that includes a plurality of SRS resources. A quantity of SRS ports configured for a first SRS resource of the plurality of SRS resources may be different relative to a quantity of SRS ports with which a second SRS resource of the plurality of SRS resources is configured. The UE may transmit a first SRS on one or more first SRS ports in the first SRS resource, and may transmit a second SRS on one or more second SRS ports in the second SRS resource. Numerous other aspects are provided.

30 Claims, 11 Drawing Sheets

(51) Int. Cl.
    *H04L 5/00* (2006.01)
    *H04B 7/0456* (2017.01)
    *H04W 72/04* (2009.01)
    *H04B 7/06* (2006.01)
(58) Field of Classification Search
    CPC ... H04L 5/0023; H04B 7/0456; H04B 7/0695; H04B 7/0617; H04W 72/042
    USPC .......................................................... 370/329
    See application file for complete search history.

(56) References Cited

U.S. PATENT DOCUMENTS

| | | | |
|---|---|---|---|
| 11,071,135 B2* | 7/2021 | Lin | H04L 5/0091 |
| 2019/0109679 A1* | 4/2019 | Liu | H04B 7/0417 |

OTHER PUBLICATIONS

Fraunhofer Ils., et al., "UE Panel-Specific UL Transmission", 3GPP Draft, R1-1900359, AH3GPP TSG RAN WG1 Meeting—1901, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593273, 5 Pages, Retrieved from the Internet:URL:http://www.3gpp.org/ftp/Meetings%5F3GPP%5FSYNC/RAN1/Docs/R1%2D1900359%2Ezip [retrieved on Jan. 20, 2019] Setion 2.
International Search Report and Written Opinion—PCT/US2020/070318—ISA/EPO—dated Oct. 19, 2020.
Qualcomm Incorporated: "Full Tx power for UL transmissions", 3GPP Draft, R1-1907291, 3GPP TSG RAN WG1 #97, Full Tx Power for UL Transmissions, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728731, pp. 1-22, Retrieved from the Internet:URL:http://www.3gpp.org/ftp/Meetings%5F3GPP%5FSYNC/RAN1/Docs/R1%2D1907291%2Ezip [retrieved on May 13, 2019] p. 3.

* cited by examiner

SOUNDING REFERENCE SIGNAL CONFIGURATION FOR SUPPORTING VIRTUAL AND NON-VIRTUAL PORT SOUNDING

CROSS-REFERENCE TO RELATED APPLICATION

This patent application claims priority to Greece Patent Application No. 20190100335, filed on Aug. 2, 2019, entitled SOUNDING REFERENCE SIGNAL CONFIGURATION FOR SUPPORTING VIRTUAL AND NON-VIRTUAL PORT SOUNDING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for configuring sounding reference signal configurations for supporting virtual and non-virtual port sounding.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a downlink control information (DCI) communication that identifies an SRS resource set that includes a plurality of SRS resources, wherein a quantity of SRS ports configured for a first SRS resource of the plurality of SRS resources is different relative to a quantity of SRS ports with which a second SRS resource of the plurality of SRS resources is configured; transmitting a first SRS on one or more first SRS ports in the first SRS resource; and transmitting a second SRS on one or more second SRS ports in the second SRS resource.

In some aspects, a UE for wireless communication may include memory and one or more processors operatively coupled to the memory. The memory and the one or more processors may be configured to receive a DCI communication that identifies an SRS resource set that includes a plurality of SRS resources, wherein a quantity of SRS ports configured for a first SRS resource of the plurality of SRS resources is different relative to a quantity of SRS ports with which a second SRS resource of the plurality of SRS resources is configured; transmit a first SRS on one or more first SRS ports in the first SRS resource; and transmit a second SRS on one or more second SRS ports in the second SRS resource.

In some aspects, a non-transitory computer-readable medium may store one or more instructions for wireless communication. The one or more instructions, when executed by one or more processors of a UE, may cause the one or more processors to receive a DCI communication that identifies an SRS resource set that includes a plurality of SRS resources, wherein a quantity of SRS ports configured for a first SRS resource of the plurality of SRS resources is different relative to a quantity of SRS ports with which a second SRS resource of the plurality of SRS resources is configured; transmit a first SRS on one or more first SRS ports in the first SRS resource; and transmit a second SRS on one or more second SRS ports in the second SRS resource.

In some aspects, an apparatus for wireless communication may include means for receiving a DCI communication that identifies an SRS resource set that includes a plurality of SRS resources, wherein a quantity of SRS ports configured for a first SRS resource of the plurality of SRS resources is different relative to a quantity of SRS ports with which a second SRS resource of the plurality of SRS resources is configured; means for transmitting a first SRS on one or more first SRS ports in the first SRS resource; and means for transmitting a second SRS on one or more second SRS ports in the second SRS resource.

In some aspects, a method of wireless communication, performed by a base station (BS), may include configuring an SRS resource set that includes a plurality of SRS resources, wherein a quantity of SRS ports configured for a first SRS resource of the plurality of SRS resources is different relative to a quantity of SRS ports with which a second SRS resource of the plurality of SRS resources is configured; and transmitting an indication of the SRS resource set in a DCI communication.

In some aspects, a BS for wireless communication may include memory and one or more processors operatively coupled to the memory. The memory and the one or more processors may be configured to configure an SRS resource set that includes a plurality of SRS resources, wherein a quantity of SRS ports configured for a first SRS resource of the plurality of SRS resources is different relative to a quantity of SRS ports with which a second SRS resource of the plurality of SRS resources is configured; and transmit an indication of the SRS resource set in a DCI communication.

In some aspects, a non-transitory computer-readable medium may store one or more instructions for wireless communication. The one or more instructions, when executed by one or more processors of a BS, may cause the one or more processors to configure an SRS resource set that includes a plurality of SRS resources, wherein a quantity of SRS ports configured for a first SRS resource of the plurality of SRS resources is different relative to a quantity of SRS ports with which a second SRS resource of the plurality of SRS resources is configured; and transmit an indication of the SRS resource set in a DCI communication.

In some aspects, an apparatus for wireless communication may include means for configuring an SRS resource set that includes a plurality of SRS resources, wherein a quantity of SRS ports configured for a first SRS resource of the plurality of SRS resources is different relative to a quantity of SRS ports with which a second SRS resource of the plurality of SRS resources is configured; and means for transmitting an indication of the SRS resource set in a DCI communication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
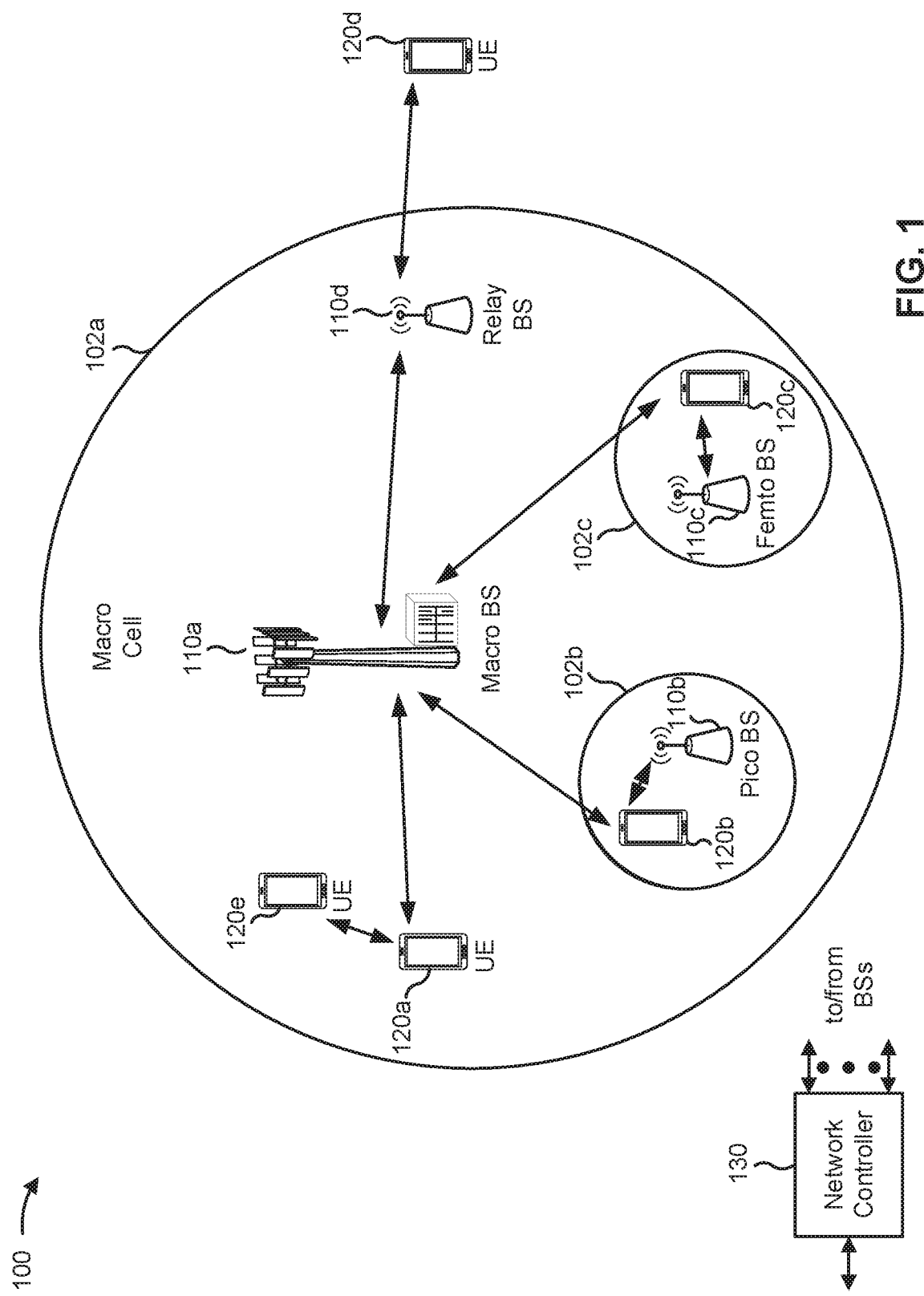
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
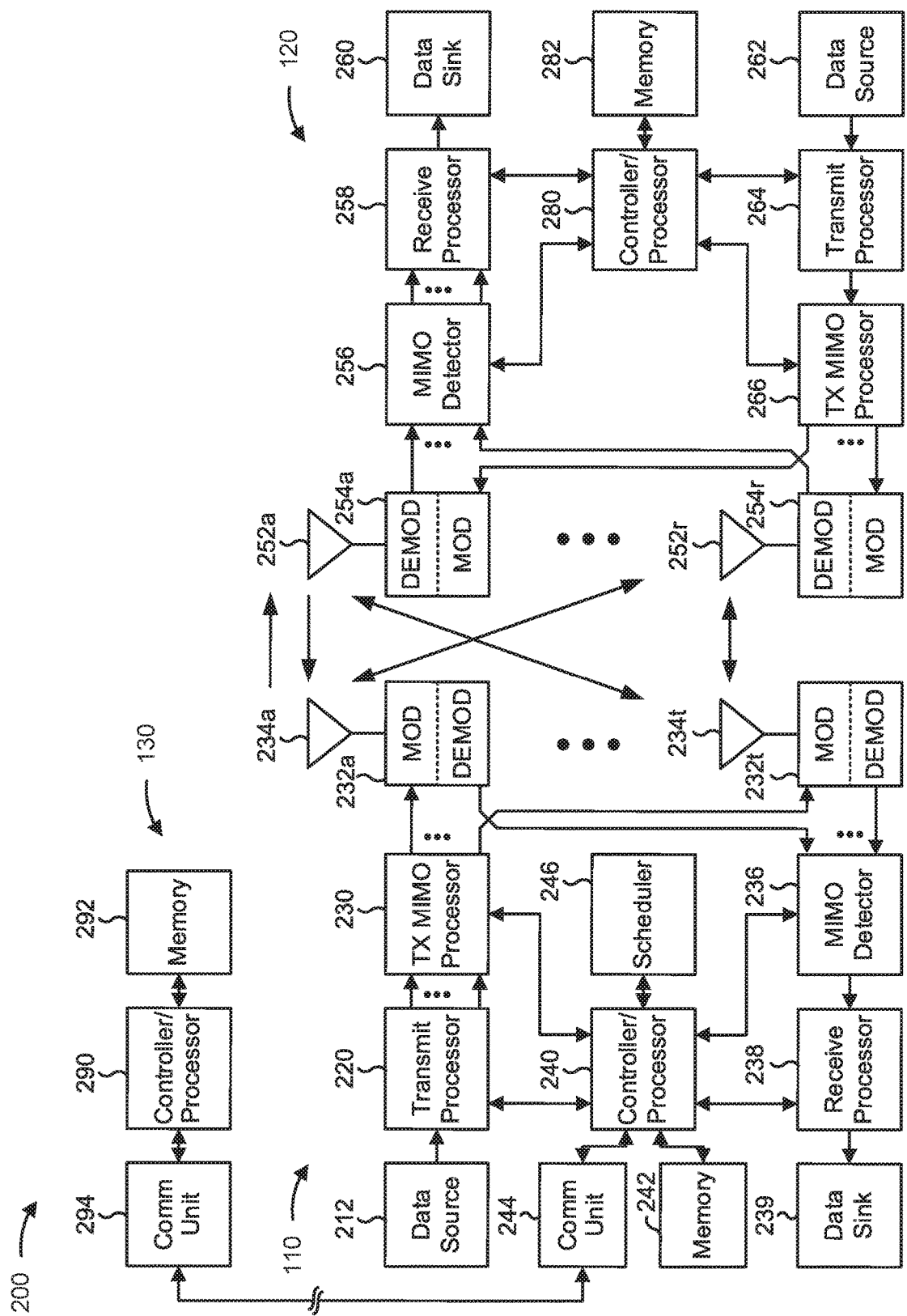
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuring sounding reference signal (SRS) configurations for supporting virtual and non-virtual port sounding, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for receiving a downlink control information (DCI) communication that identifies an SRS resource set that includes a plurality of SRS resources, wherein a quantity of SRS ports configured for a first SRS resource of the plurality of SRS resources is different relative to a quantity of SRS ports with which a second SRS resource of the plurality of SRS resources is configured (e.g., antenna 252, DEMOD 254, MIMO detector 256, receive processor 258, controller/processor 280, memory 282, and/or the like), means for transmitting a first SRS on one or more first SRS ports in the first SRS resource (e.g., controller/processor 280, transmit processor 264, TX MIMO processor 266, MOD 254, antenna 252, and/or the like, means for transmitting a second SRS on one or more second SRS ports in the second SRS (e.g., controller/processor 280, transmit processor 264, TX MIMO processor 266, MOD 254, antenna 252, and/or the like), and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for configuring an SRS resource set that includes a plurality of SRS resources, wherein a quantity of SRS ports configured for a first SRS resource of the plurality of SRS resources is different relative to a quantity of SRS ports with which a second SRS resource of the plurality of SRS resources is configured (e.g., controller/processor 240, transmit processor 220, TX MIMO processor 230, MOD 232, antenna 234, and/or the like), means for transmitting an indication of the SRS resource set in a DCI communication (e.g., controller/processor 240, transmit processor 220, TX MIMO processor 230, MOD 232, antenna 234, and/or the like), and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
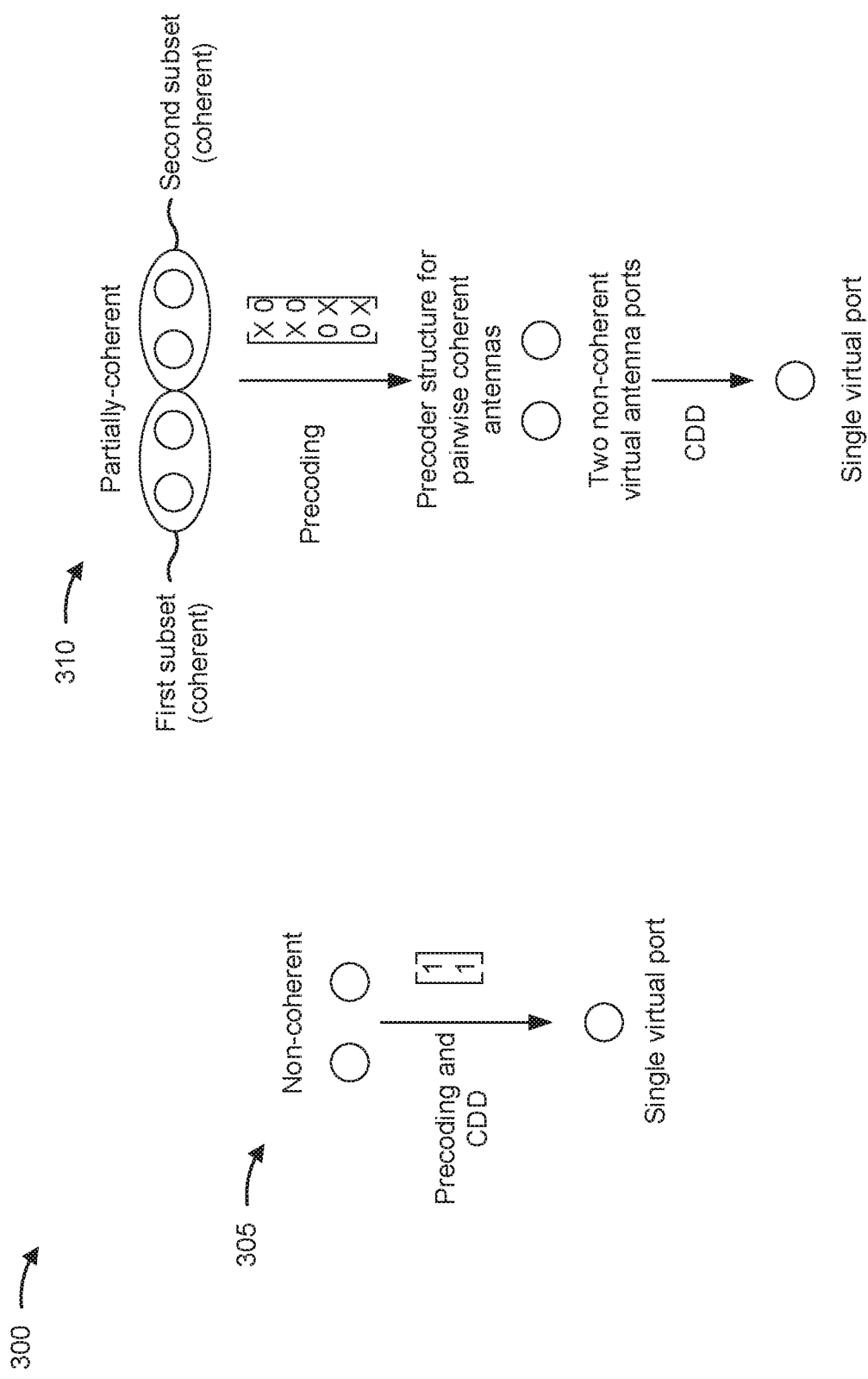
FIG. 3 is a diagram illustrating one or more examples of forming a virtual port by combining non-coherent and/or partially-coherent antenna ports, in accordance with various aspects of the present disclosure.

FIG. 3 is a diagram illustrating one or more examples 300 of forming a virtual antenna port by combining non-coherent and/or partially-coherent antenna ports, in accordance with various aspects of the present disclosure.

The antennas of a multi-antenna UE (e.g., UE 120) may be classified into one of three groups depending on coherence of the antenna ports of the UE. A set of antenna ports (for example, two antenna ports) are coherent if the relative phase among the set of antenna ports (for example, between the two antenna ports) remains the same between the time of an SRS transmission from those antenna ports and a subsequent physical uplink shared channel (PUSCH) transmission from those antenna ports. In this case, the SRS may be used (for example, by the UE or a BS) to determine an uplink precoder for precoding the PUSCH transmission, because the relative phase of the antenna ports will be the same for the SRS transmission and the PUSCH transmission. The precoding may span across the set of coherent antenna ports.

If a set of antenna ports is non-coherent, then such uplink precoder determination becomes difficult, because the relative phase between the antenna ports will change from the SRS transmission to the PUSCH transmission. For example, a set of antenna ports is considered non-coherent if the relative phase among the set of antenna ports is different for the SRS transmission than for the PUSCH transmission. In this case, the use of the same uplink precoder for a set of non-coherent antenna ports may result in the UE applying improper or inaccurate precoding weights (such as phase and gain weights) to the data streams transmitted from the non-coherent antenna ports. Furthermore, a set of antenna ports is considered partially-coherent if a first subset of the set of antenna ports is coherent with one another and a second subset of the set of antenna ports is coherent with one another, but the first subset of antenna ports and the second subset of antenna ports are not coherent with one another. In this case, common precoding may be used within each of the respective subsets of coherent antenna ports, but not across the different subsets of non-coherent antenna ports.

In some cases, when a BS schedules a PUSCH transmission for a multi-antenna UE having non-coherent or partially-coherent antenna ports, the signaling communication that schedules the PUSCH transmission may identify an uplink precoder that is to be used to precode the PUSCH transmission. Conventionally, because the antenna ports of the UE are non-coherent (or, in the case of partially coherent antenna ports, are non-coherent groups of coherent antenna ports), the UE may be capable of using the uplink precoder for only one of the antenna ports (or antenna port groups) while other antenna ports (or antenna port groups) are not used for the PUSCH transmission. Because only a subset of non-coherent or partially coherent antenna ports are used, this may result in decreased transmit power of the PUSCH transmission, decreased reliability of the PUSCH transmission (due to lack of transmit or spatial diversity), or the like.

To utilize some or all of the non-coherent or partially coherent antenna ports, the UE may apply various techniques to synthesize non-coherent or partially coherent antenna ports into a virtual antenna port so that common precoding may be used on the virtual antenna port and applied across the non-coherent antenna ports. A virtual (or logical) antenna port may represent a combination of two or more antenna ports. This allows a BS to select an uplink precoder for the virtual antenna port, and allows the UE to use the uplink precoder to transmit on the otherwise non-coherent or partially coherent antenna ports that have been combined to form the virtual antenna port.

For example, as shown by reference number 305, a set of non-coherent antenna ports (e.g., shown as two non-coherent antenna ports) can be combined into a single virtual port using precoding (e.g., uplink precoding) and cyclic delay diversity. The precoder may be determined by the UE 120 and/or signaled by a base station 110. Cyclic delay diversity (CDD) may refer to a technique where a delay (e.g., a cyclic delay) is introduced on one of the non-coherent antenna ports and not the other non-coherent antenna port. The delay may be measured in samples (e.g., 5 samples, 10 samples, and/or the like), fractions of samples, and/or the like. For example, a first non-coherent antenna port may transmit a first stream of samples, and the second non-coherent antenna port may transmit a second stream of samples (e.g., which may be the same stream) with a slight cyclic delay (e.g., a delay of 5 samples, 10 samples, and/or the like). For example, for a cyclic delay of 5 samples, where 16 samples are transmitted per symbol, the first non-coherent antenna port may transmit the 16 samples with a first sample transmitted first (e.g., [s1, s2, s3, s4, . . . , s16]), and the second non-coherent antenna port may transmit the 16 samples with the first sample transmitted sixth (e.g., with a delay of five samples) (e.g., [s12, s13, s14, s15, s16, s1, s2, s3, . . . , s11]).

Additionally, or alternatively, as shown by reference number 310, a set of partially-coherent antenna ports can be combined into a single virtual antenna port using precoding (e.g., uplink precoding) and cyclic delay diversity, in a similar manner as described above. As shown, a first subset of antenna ports may be coherent with one another, and a second subset of antenna ports may be coherent with one another, but the two subsets may not be coherent with one another. As further shown, precoding may be applied to the individual subsets to generate a first virtual antenna port and a second virtual antenna port that are not coherent with one another. Then, CDD may be applied to these two virtual antenna ports (e.g., by transmitting communications from the virtual antenna ports using CDD), thereby forming a single virtual antenna port from the partially-coherent antenna ports (e.g., using precoding and CDD).

Although FIG. 3 shows pairs of antenna ports in sets and subsets, in some aspects, a different number of antenna ports may be included in a set or a subset. For example, a set of antenna ports or subset of antenna ports may include three antenna ports, four antenna ports, and/or the like.

As indicated above, FIG. 3 is provided as one or more examples. Other examples are possible and may differ from what is described with regard to FIG. 3.

In some cases, a UE that is configured with a plurality of antenna ports may be configured to use the plurality of antenna ports for MIMO communication. However, if the antenna ports are non-coherent and/or partially-coherent antenna ports, the UE may be unable to simultaneously transmit using all of the antenna ports, and in turn may be unable to achieve full transmit power. Accordingly, the UE may synthesize the non-coherent and/or partially-coherent antenna ports to form a virtual antenna port, which may be used for full-power transmission.

In some cases, a UE may transmit an SRS on non-virtual antenna ports (e.g., non-coherent and/or partially-coherent antenna ports) or on non-coherent virtual antenna ports (e.g., virtual antenna ports that are formed based at least in part on partially-coherent groups of non-coherent non-virtual antenna ports) such that the BS may select an uplink precoder for the non-virtual antenna ports based at least in part on the SRS, and may configure the UE to perform MIMO communication using the non-virtual antenna ports. Similarly, the UE may transmit an SRS on virtual antenna ports such that the BS may select an uplink precoder for the virtual antenna ports based at least in part on the SRS, and may configure the UE to perform full-power communication using the virtual antenna ports.

The BS may configure an SRS resource set having an SRS usage set to codebook (for example, where a field, such as an SRS-ResourceSet.usage field and/or another field in an SRS resource indicator, is set to 'CodeBook'), which may be a use case for acquiring uplink channel state information (CSI) and determining uplink precoding. In this case, the UE may transmit an SRS on an antenna port (e.g., a non-virtual antenna port or a virtual antenna port) using an SRS resource included in the SRS resource set. While the BS may be able to configure an SRS resource set that permits the UE to transmit an SRS for a non-virtual antenna port or a virtual antenna port, the BS may be unable to configure an SRS resource set that permits the UE to transmit SRSs for different types of antenna ports (e.g., non-virtual antenna ports and virtual antenna ports) in the same SRS resource set, and/or may be unable to configure a plurality of SRS resource sets with SRS usage set to codebook that permits the UE to transmit SRSs for different configurations of non-virtual antenna ports and virtual antenna ports. As a result, the BS may not be permitted to dynamically configure different transmission modes for the UE (e.g., a MIMO transmission mode using non-virtual antenna ports and/or non-coherent virtual SRS ports, a full-power transmission mode using a virtual antenna port, and/or the like), which may prevent the UE from utilizing MIMO or full-power transmission capabilities.

Some aspects described herein provide techniques and apparatuses for configuring SRS configurations for supporting virtual and non-virtual port sounding. In some aspects, a BS may be permitted to configure an SRS resource set that permits a UE to transmit an SRS on one or more non-virtual antenna ports (referred to herein as non-virtual SRS ports) and on one or more virtual antenna ports (referred to herein as virtual SRS ports), such that the BS is permitted to dynamically configure different transmission modes for the UE (e.g., a MIMO transmission mode using non-virtual SRS ports and/or non-coherent virtual SRS ports, a full-power transmission mode using a virtual SRS port, and/or the like). Moreover, the BS may be permitted to configure a plurality of SRS resource sets indicated as having an SRS resource set with usage set to codebook or 'CodeBook', which permits the UE to sound different combinations of non-virtual SRS ports and virtual SRS ports, which increases the flexibility in configuring transmission modes for the UE.

Figure 4:
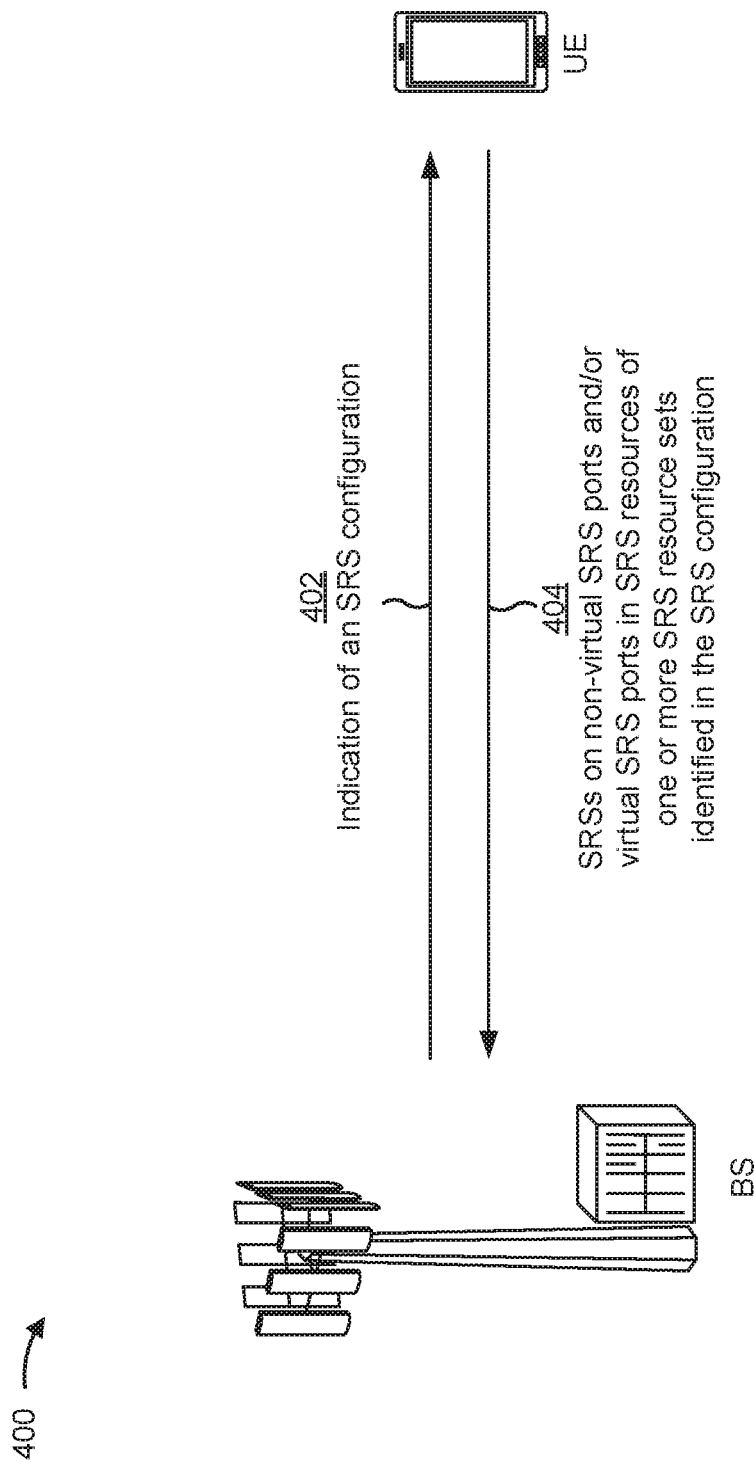
FIG. 4 is a diagram illustrating one or more examples of configuring sounding reference signal (SRS) configurations for supporting virtual and non-virtual port sounding, in accordance with various aspects of the present disclosure.

FIG. 4 is a diagram illustrating one or more examples 400 of configuring SRS configurations for supporting virtual and non-virtual port sounding, in accordance with various aspects of the present disclosure. As shown in FIG. 4, examples 400 involve a multi-antenna or multi-panel UE (e.g., UE 120) and a BS (e.g., BS 110). Each antenna or antenna panel may be associated with a respective non-virtual SRS port. The non-virtual SRS ports may be non-coherent antenna ports or partially coherent antenna ports.

In some aspects, the UE may be capable of performing MIMO transmissions on the non-virtual SRS ports and/or on non-coherent virtual SRS ports. For example, the UE may transmit the same stream or respective streams on each of the non-virtual SRS ports for spatial diversity and/or other purposes. Moreover, the UE may be capable of forming one or more virtual SRS ports by combining two or more of the non-virtual SRS ports (e.g., using one or more of the techniques described above in connection with FIG. 3 and/or other techniques). In this case, the UE may be capable of performing full-power transmissions on the one or more virtual SRS ports.

As shown in FIG. 4, and by reference number 402, the BS may transmit an indication of an SRS configuration to the UE. In some aspects, the BS may configure the SRS configuration to identify one or more SRS resource sets, for example, that are indicated as having an SRS resource set with usage set to codebook or 'CodeBook'. The BS may configure each SRS resource set to include a plurality of SRS resources in which the UE may transmit SRSs on the non-virtual SRS ports and/or the virtual SRS ports to sound the non-virtual SRS ports and/or the virtual SRS ports. In this way, the BS may perform one or more measurements of the SRSs and may identify uplink precoders for precoding uplink communications that the UE transmits in the SRS resources. This permits the BS to configure the UE to perform MIMO transmissions in SRS resources in which non-virtual SRS ports or non-coherent virtual SRS ports are sounded, and full-power transmissions in SRS resources in which a virtual SRS port is sounded.

In some aspects, the BS may transmit the SRS configuration to the UE in system information and/or one or more signaling communications. The system information may include one or more system information blocks (SIBs), remaining minimum system information (RMSI), other system information (OSI), and/or the like. The one or more signaling communications may include one or more radio resource control (RRC) communications, one or more medium access control (MAC) control element (MAC-CE) communications, one or more downlink control (DCI) communications, and/or the like.

In some aspects, the BS may configure the SRS configuration to include and/or identify a plurality of SRS resource sets. In this case, each SRS resource set may be associated with a respective antenna or antenna panel of the UE. In some aspects, the BS may configure each SRS resource set to include a plurality of SRS resources. For example, an SRS resource set may include two SRS resources. In this case, the BS may configure a one-bit indicator to identify a first SRS resource indicator (SRI) associated with a first SRS resource (e.g., a 1 value) or a second SRI associated with a second SRS resource (e.g., a 0 value). In this way, the BS may configure the UE (e.g., via DCI or another type of signaling communication) to transmit an uplink communication in the first SRS resource by indicating the first SRI to the UE, and/or may configure the UE to transmit an uplink communication in the second SRS resource by indicating the second SRI to the UE.

In some aspects, the BS may configure one or more SRS resource sets, identified in the SRS configuration, to include more than two SRS resources. In this case, the BS may configure a two-bit (or more) indicator to identify respective SRIs associated with the more than two SRS resources (e.g., 00 for a first SRI, 01 for a second SRI, 10 for a third SRI, 11 for a fourth SRI, and so on).

In some aspects, the BS may configure the SRS configuration to identify a respective SRI for each SRS resource included in an SRS resource set that is identified in the SRS configuration. For example, the BS may configure one or more bits of the SRS configuration to identify the respective SRIs.

In some aspects, the BS may configure SRS resources in a same SRS resource set to include the same quantity of SRS ports. In some aspects, the BS may configure two or more SRS resources in a same SRS resource set to include different quantities of SRS ports. Permitting the BS to configure two or more SRS resources in a same SRS resource set to include different quantities of SRS ports allows the BS to configure the SRS resources of the same SRS resource set for different transmission modes of the UE. As an example, the BS may configure a first SRS resource of an SRS resource set to include two SRS ports (e.g., non-virtual SRS ports or non-coherent virtual SRS ports) for a MIMO transmission mode, and may configure a second SRS resource of the SRS resource set to include one SRS port (e.g., a virtual SRS port formed by combining the two non-virtual SRS ports) for a full-power transmission mode. In this way, the BS may configure the UE to transmit one or more uplink MIMO communications in the first SRS resource by signaling the SRI of the first SRS resource in an uplink scheduling communication (e.g., a DCI communication and/or another type of scheduling communication), and/or may configure the UE to transmit one or more uplink full-power communications in the second SRS resource by signaling the SRI of the second SRS resource in an uplink scheduling communication.

In some aspects, the BS may configure two or more SRS resources in a same SRS resource set to include different quantities of SRS ports for supporting different transmission modes of the UE based at least in part on receiving an indication that the UE supports or is capable of a plurality of transmission modes. For example, the UE may indicate to the BS that the UE supports MIMO communication and full-power transmission using a plurality of antennas and/or antenna panels.

In some aspects, the BS may configure spatial filters (which may also be referred to as mapping functions or beam forming functions) for the SRS resource sets identified in the SRS configuration and/or for the SRS resources included in the SRS resource sets. In this way, the BS may configure the same or different beam forming parameters for two or more SRS resource sets and/or two or more SRS resources in a same SRS resource set.

In some aspects, the BS may configure spatial filters with an SRS resource set granularity. In this case, the BS may configure a particular spatial filter for an SRS resource set, and the spatial filter may be used for all SRS resources included in the SRS resource set. In some aspects, the BS may configure two or more SRS resource sets with the same spatial filter or different spatial filters.

In some aspects, the BS may configure spatial filters at an SRS resource granularity. In this case, the BS may individually configure spatial filters for SRS resources in an SRS resource set and/or in other SRS resource sets. In some aspects, when configuring spatial filters at an SRS resource granularity, the BS may configure two or more SRS resources in an SRS resource set with the same spatial filter, and/or may configure two or more SRS resources in an SRS resource set with different spatial filters. Moreover, the BS may configure SRS resources for non-virtual SRS ports with the same or different spatial filters, may configure SRS resources for virtual SRS ports with the same or different spatial filters, and/or may configure SRS resources for non-virtual SRS ports and SRS resources for virtual SRS ports with the same or different spatial filters. The ability to flexibly configure different SRS resources and/or different types of SRS ports with the same or different spatial filters permits the BS to schedule uplink transmissions with increased spatial selection diversity.

As further shown in FIG. 4, and by reference number 404, the UE may receive the SRS configuration and may transmit SRSs on non-virtual SRS ports and/or virtual SRS ports in SRS resources included in one or more SRS resource sets identified in the SRS configuration. For example, the UE may transmit a first SRS on one or more first SRS ports (e.g., non-virtual SRS ports) in a first SRS resource of an SRS resource set identified in the SRS configuration, may transmit a second SRS on one or more second SRS ports (e.g., virtual SRS ports) in a second SRS resource of the SRS resource set, and so on.

In some aspects, the SRS that is transmitted on the one or more ports for an SRS resource may identify the SRS resource and/or the SRI of the SRS resource. For example, the SRS may include a sequence (e.g., a Gold code sequence, a Zadoff-Chu sequence, and/or the like) that is generated using the SRI of the SRS resource as input to initializing the sequence.

The BS may receive the SRSs transmitted on the non-virtual SRS ports and/or virtual SRS ports and in the SRS resources included in the one or more SRS resource sets identified in the SRS configuration. The BS may perform one or more measurements associated with the SRSs, such as one or more RSRP measurements, one or more RSSI measurements, one or more RSRQ measurements, one or more CQI measurements, and/or the like. The BS may select uplink precoders for the SRS resources based at least in part on the results of the one or more measurements.

Moreover, the BS may schedule an uplink communication for the UE by transmitting an indication of an SRI associated with an SRS resource (e.g., one or more bits in a DCI communication and/or another type of signaling communication that identifies the SRS resource) and an indication of the corresponding uplink precoder that the UE is to use to transmit the uplink communication. The UE may receive the indication of the SRI and uplink precoder, may precode the uplink communication based at least in part on the uplink precoder, and may transmit the uplink communication in the SRS resource associated with the SRI. Moreover, the UE may transmit the uplink communication using the spatial filter, associated with the SRS resource, indicated in the SRS configuration.

In some aspects, the BS may schedule an uplink MIMO communication for the UE by transmitting an indication of an SRI associated with an SRS resource that includes non-virtual SRS ports or non-coherent virtual SRS ports. In some aspects, the BS may schedule an uplink full-power communication for the UE by transmitting an indication of an SRI associated with an SRS resource that includes a virtual SRS port.

In this way, the BS may be permitted to configure one or more SRS resource sets that permit the UE to transmit SRSs on one or more non-virtual SRS ports and/or on one or more virtual SRS ports. This permits the BS to dynamically configure different transmission modes for the UE (e.g., a MIMO transmission mode using non-virtual SRS ports and/or non-coherent virtual SRS ports, a full-power transmission mode using virtual SRS ports, and/or the like). Moreover, this permits the BS to configure a plurality of SRS resource sets for an SRS usage of codebook or 'CodeBook', which permits the UE to sound different combinations of non-virtual SRS ports and virtual SRS ports, which increases the flexibility in configuring transmission modes for the UE.

As indicated above, FIG. 4 is provided as one or more examples. Other examples may differ from what is described with respect to FIG. 4.

FIGS. 5A-5E are diagrams illustrating various examples 500 of SRS configurations for supporting virtual and non-virtual port sounding, in accordance with various aspects of the present disclosure. In some aspects, the example SRS configurations illustrated in FIGS. 5A-5E may be configured by a BS (e.g., BS 110) for a multi-antenna or multi-panel UE (e.g., UE 120), and may permit the BS to configure one or more SRS resource sets for an SRS usage of codebook or 'CodeBook', which permits the UE to sound different combinations of non-virtual SRS ports and virtual SRS ports. In this way, the BS may configure one or more of the example SRS configurations to dynamically configure different transmission modes for the UE (e.g., a MIMO transmission mode using non-virtual SRS ports, a full-power transmission mode using virtual SRS ports, and/or the like). The example SRS configurations illustrated in FIGS. 5A-5E are examples, and other SRS configurations may be used to configure one or more SRS resource sets for an SRS usage of codebook or 'CodeBook'.

Figure 5A:
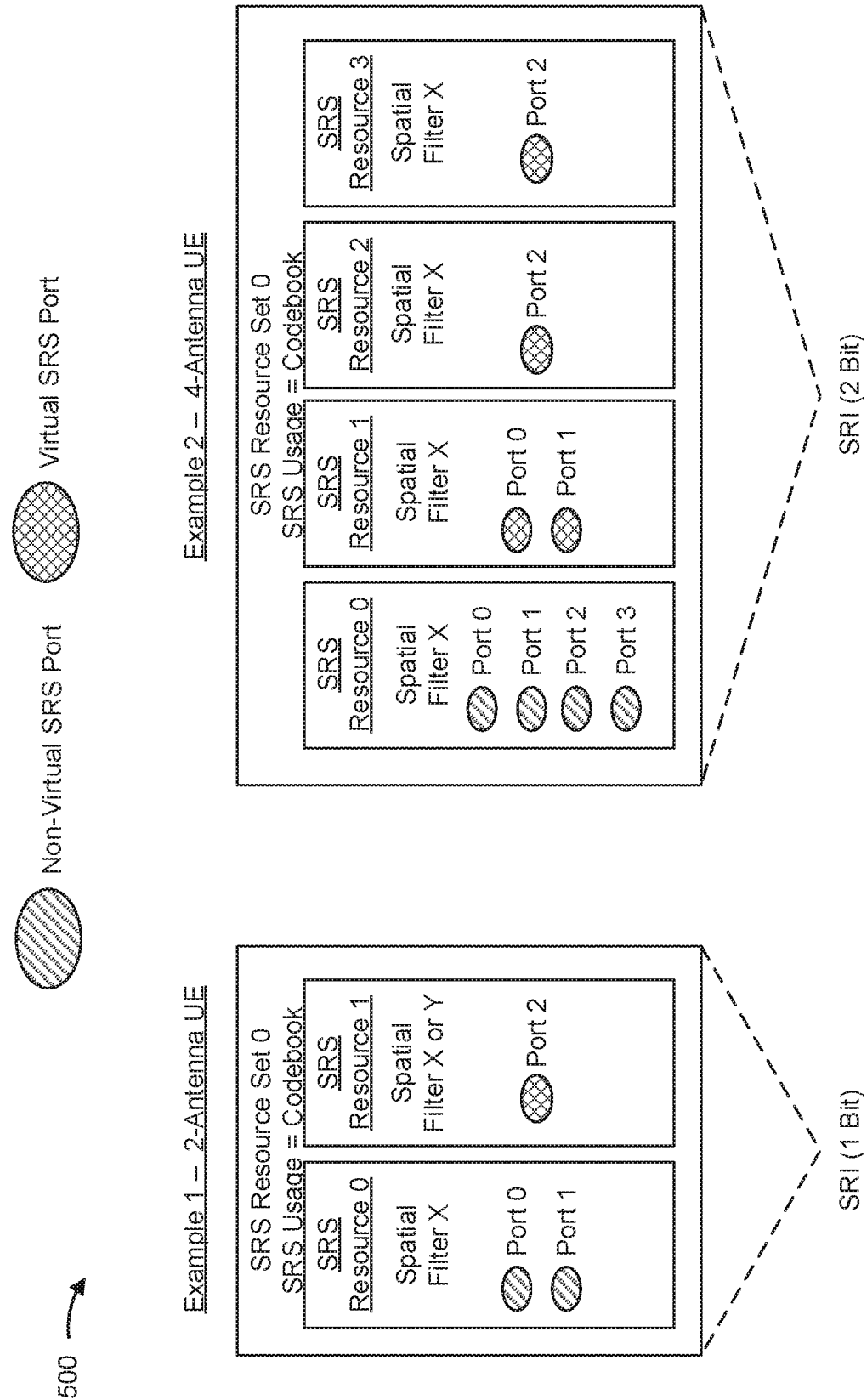
FIGS. 5A-5E are diagrams illustrating examples of SRS configurations for supporting virtual and non-virtual port sounding, in accordance with various aspects of the present disclosure.

As shown in FIG. 5A, example 1 may include an SRS configuration for a UE configured with two antennas or antenna panels. The SRS configuration may include one SRS resource set (e.g., SRS resource set 0), which may include a plurality of SRS resources (e.g., SRS resource 0 and SRS resource 1). Each SRS resource may be identified by an associated 1-bit SRI. Moreover, each SRS resource may be associated with the same or different spatial filters. For example, SRS resource 0 and SRS resource 1 may both be associated with spatial filter X. As another example, SRS resource 0 may be associated with spatial filter X, and SRS resource 1 may be associated with spatial filter Y. In some aspects, SRS resource 0 may be configured for uplink MIMO transmission and may be configured with a plurality of non-virtual SRS ports (e.g., port 0 and port 1). SRS resource 1 may be configured for full-power transmission and may be configured with a virtual SRS port (e.g., port 2) that is formed based at least in part on the plurality of non-virtual SRS ports configured for SRS resource 0.

As further shown in FIG. 5A, example 2 may include an SRS configuration for a UE configured with four antennas or antenna panels. The SRS configuration may include one SRS resource set (e.g., SRS resource set 0), which may include a plurality of SRS resources (e.g., SRS resource 0 through 3). Each SRS resource may be identified by an associated 2-bit SRI. Moreover, each SRS resource may be associated with the same spatial filter (e.g., spatial filter X), which may implicitly indicate that virtual SRS ports configured for the SRS resource set are formed from the non-virtual SRS ports configured for the SRS resource set.

As further shown in example 2 in FIG. 5A, SRS resource 0 may be configured for uplink MIMO transmission and may be configured with a plurality of non-virtual SRS ports (e.g., ports 0 through 3). SRS resource 1 may also be configured for uplink MIMO transmission and may be configured with a plurality of non-coherent virtual SRS ports (e.g., port 0 and port 1) that are formed based at least in part on the plurality of non-virtual SRS ports (e.g., which may be included in a plurality of partially-coherent groups of non-coherent antenna ports). SRS resource 2 may be configured for full-power transmission and may be configured with a virtual SRS port (e.g., port 2) that is formed based at least in part on the plurality of non-coherent virtual SRS ports configured for SRS resource 1. SRS resource 3 may be configured for full-power transmission and may be configured with the same virtual SRS port (e.g., port 2) as SRS resource 2.

Figure 5B:
Figure 5B:

As shown in FIG. 5B, example 3 may include an SRS configuration for a UE configured with two antennas or antenna panels. The SRS configuration may include one SRS resource set (e.g., SRS resource set 0), which may include a plurality of SRS resources (e.g., SRS resource 0 through 3). Each SRS resource may be identified by an associated 2-bit SRI.

As further shown in example 3 in FIG. 5B, SRS resource 0 may be configured for uplink MIMO transmission and may be configured with a plurality of non-virtual SRS ports (e.g., port 0 and port 1). SRS resource 1 may also be configured for uplink MIMO transmission and may be configured with the same plurality of non-coherent virtual SRS ports (e.g., port 0 and port 1) as SRS resource 0. SRS resource 2 may be configured for full-power transmission and may be configured with a virtual SRS port (e.g., port 2) that is formed based at least in part on the plurality of non-virtual SRS ports configured for SRS resource 1 and 2. SRS resource 3 may be configured for full-power transmission and may be configured with the same virtual SRS port (e.g., port 2) as SRS resource 2.

As further shown in example 3 in FIG. 5B, subsets of the SRS resources included in SRS resource set 0 may be associated with a respective spatial filter. For example, SRS resource 0 and SRS resource 2 may be associated with spatial filter X, and SRS resource 1 and SRS resource 3 may be associated with spatial filter Y. In this way, the UE is permitted to select from two candidate spatial filters for uplink MIMO transmission and two candidate spatial filters for uplink full-power transmission, which increases spatial selection diversity.

Figure 5C:
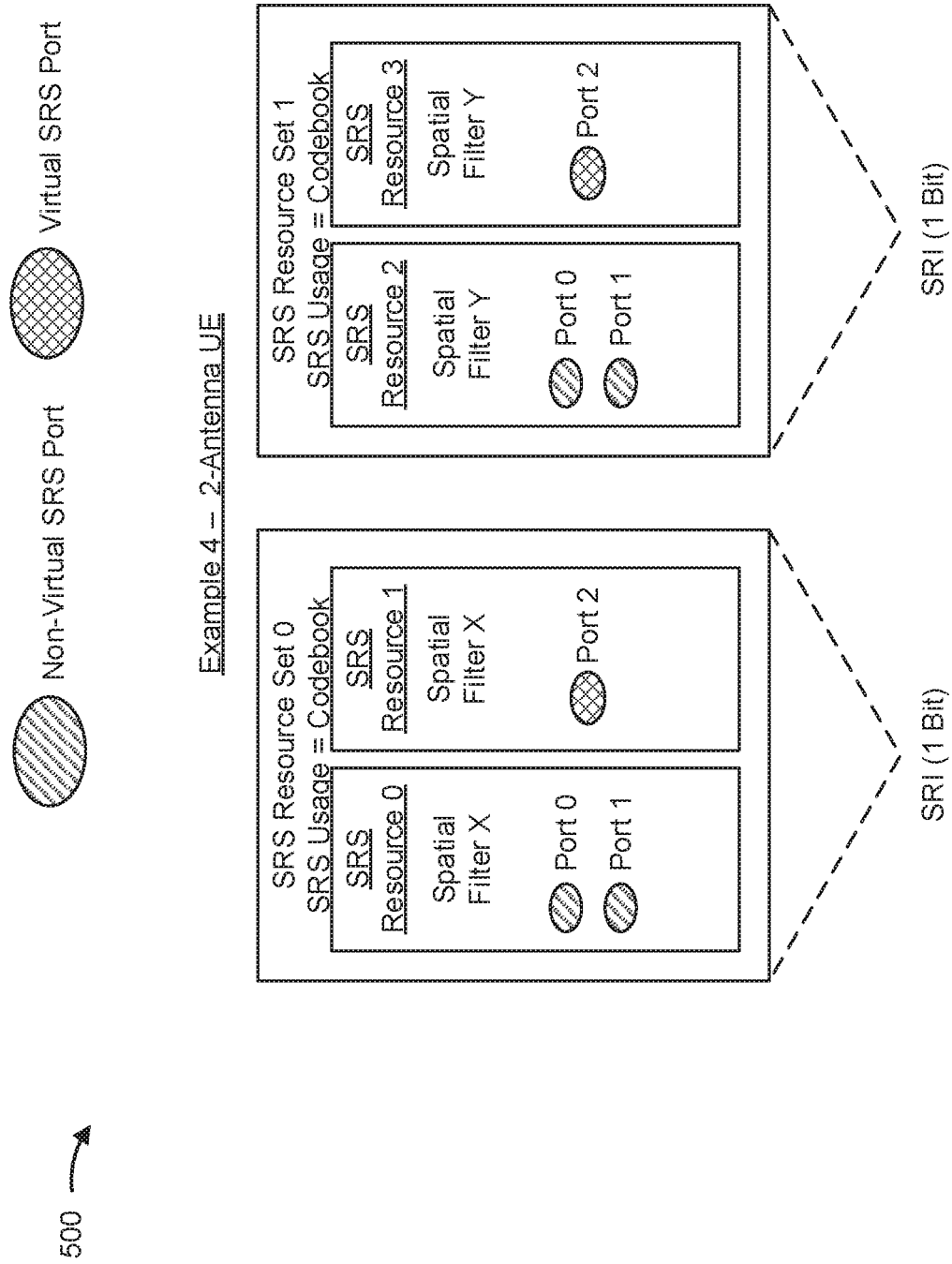

As shown in FIG. 5C, example 4 may include an SRS configuration for a UE configured with two antennas or antenna panels. The SRS configuration may include a plurality of SRS resource sets (e.g., SRS resource set 0 and SRS resource set 1). Each of the plurality of SRS resource sets may include a plurality of SRS resources. For example, SRS resource set 0 may include SRS resource 0 and SRS resource 1, and SRS resource set 1 may include SRS resource 2 and SRS resource 3. Each SRS resource, included in a particular SRS resource set, may be identified in the SRS resource set by an associated 1-bit SRI.

In some aspects, SRS resource 0 may be configured for uplink MIMO transmission and may be configured with a plurality of non-virtual SRS ports (e.g., port 0 and port 1). SRS resource 1 may be configured for full-power transmission and may be configured with a virtual SRS port (e.g., port 2) that is formed based at least in part on the plurality of non-virtual SRS ports configured for SRS resource 0. SRS resource 2 may also be configured for uplink MIMO transmission and may be configured with the same non-virtual SRS ports as SRS resource 0 (e.g., port 0 and port 1). SRS resource 1 may also be configured for full-power transmission and may be configured with the same virtual SRS port as SRS resource 1 (e.g., port 2).

The SRS resources included in SRS resource set 0 may be associated with the same spatial filter (e.g., spatial filter X), and the SRS resources included in SRS resource set 1 may be associated with the same spatial filter (e.g., spatial filter Y), which may be different from the spatial filter associated with the SRS resources included in SRS resource set 0. Similar to example 3 described above, this permits the UE to select from two candidate spatial filters for uplink MIMO transmission and two candidate spatial filters for uplink full-power transmission, which increases spatial selection diversity. However, since the BS is permitted to configure a plurality of SRS resource sets for an SRS usage of codebook or 'CodeBook', the overhead of indicating an SRI for an SRS resource in an uplink scheduling communication (e.g., a DCI and/or another type of scheduling communication) is reduced from two bits to one bit, which reduces the size of the uplink scheduling communication.

Figure 5D:
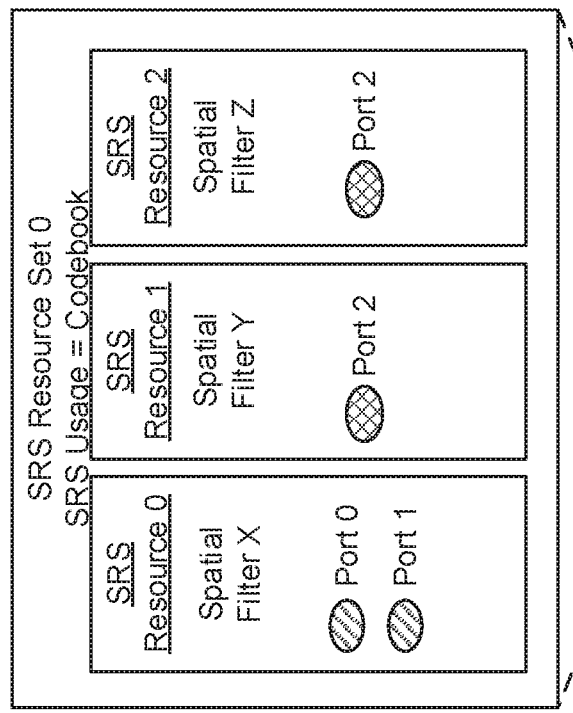

As shown in FIG. 5D, example 5 may include an SRS configuration for a UE configured with two antennas or antenna panels. The SRS configuration may include one SRS resource set (e.g., SRS resource set 0), which may include a plurality of SRS resources (e.g., SRS resources 0 through 2). Each SRS resource may be identified by an associated 2-bit SRI. Moreover, each SRS resource may be associated with a different spatial filter. For example, SRS resource 0 may be associated with spatial filter X, SRS resource 1 may be associated with spatial filter Y, and SRS resource 2 may be associated with spatial filter Z.

As further shown in example 5 in FIG. 5D, SRS resource 0 may be configured for uplink MIMO transmission and may be configured with a plurality of non-virtual SRS ports (e.g., port 0 and port 1). SRS resource 1 may be configured for full-power transmission and may be configured with a virtual SRS port (e.g., port 2) that is formed based at least in part on the plurality of non-virtual SRS ports configured for SRS resource 0. SRS resource 1 may also be configured for full-power transmission and may be configured with the same virtual SRS port (e.g., port 2) configured for SRS resource 1.

Figure 5E:
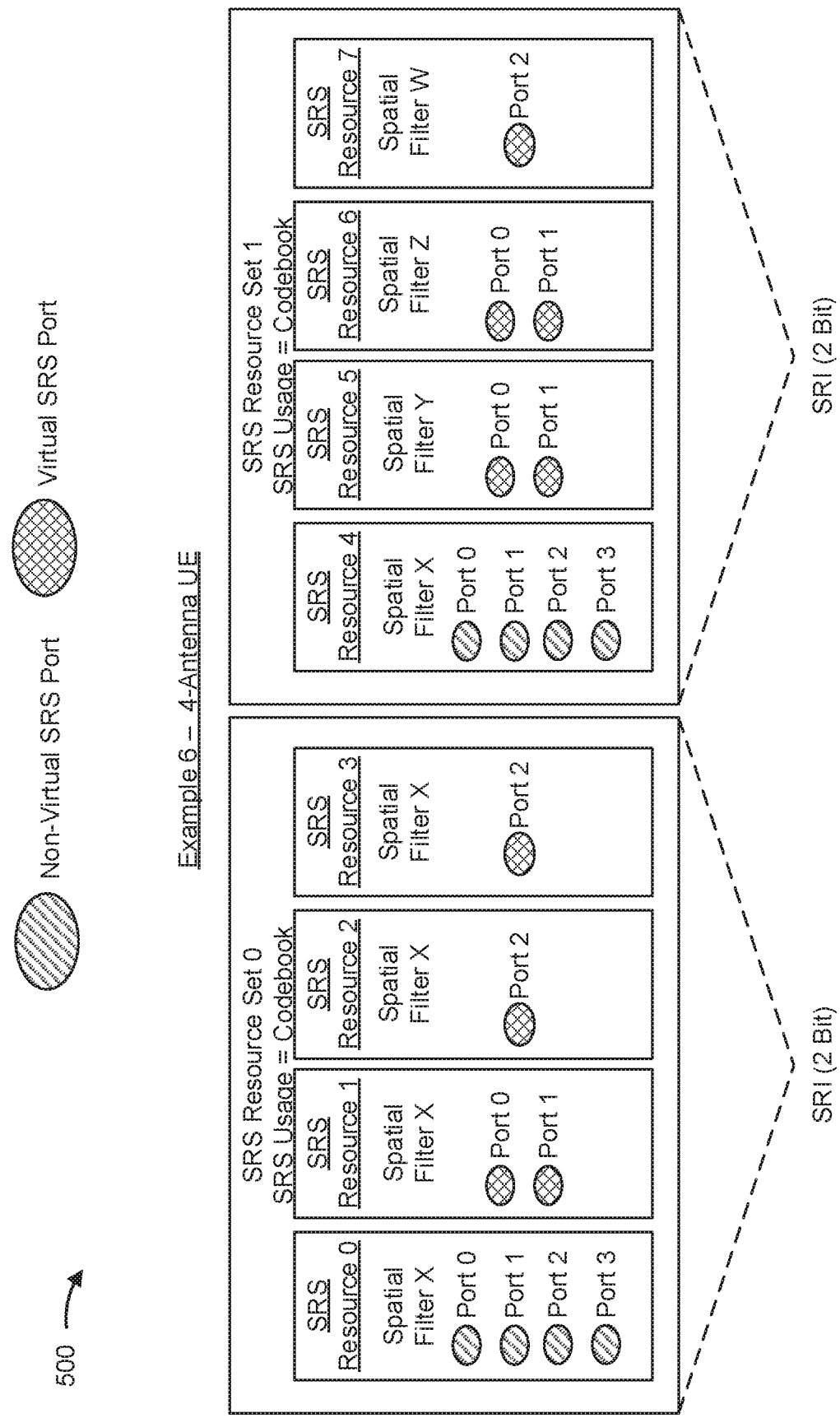

As shown in FIG. 5E, example 6 may include an SRS configuration for a UE configured with four antennas or antenna panels. The SRS configuration may include a plurality of SRS resource sets (e.g., SRS resource set 0 and SRS resource set 1). Each of the plurality of SRS resource sets may include a plurality of SRS resources. For example, SRS resource set 0 may include SRS resources 0 through 3, and SRS resource set 1 may include SRS resource 4 and SRS resource 7. Each SRS resource, included in a particular SRS resource set, may be identified in the SRS resource set by an associated 2-bit SRI.

In some aspects, SRS resource 0 and SRS resource 4 may both be configured for uplink MIMO transmission and may both be configured with the same plurality of non-virtual SRS ports (e.g., ports 0 through 3). SRS resources 1 through 3, and SRS resources 5 through 7 may all be configured for full-power transmission. SRS resource 1, SRS resource 5, and SRS resource 6 may all be configured with the same non-coherent virtual SRS ports (e.g., port 0 and port 1) that are formed based at least in part on the plurality of non-virtual SRS ports (e.g., which may be included in partially-coherent groups of non-coherent non-virtual antenna ports) configured for SRS resource 0 and SRS resource 4. SRS resource 2, SRS resource 3, and SRS resource 7 may also be configured for full-power transmission and may be configured with the same virtual SRS port (e.g., port 2), which may be formed based at least in part on the plurality of non-coherent virtual SRS ports configured for SRS resource 1, SRS resource 5, and SRS resource 6.

As further shown in example 6 illustrated in FIG. 5E, the SRS resources included in SRS resource set 0 and SRS resource 4 may be associated with the same spatial filter (e.g., spatial filter X). Moreover, SRS resources 5 through 7 may be associated with different spatial filters, which may also be different from the spatial filter associated with the SRS resources included in SRS resource 0 and SRS resource 4. For example, SRS resource 5 may be associated with spatial filter Y, SRS resource 6 may be associated with spatial filter Z, and SRS resource 7 may be associated with spatial filter W.

As indicated above, FIGS. 5A-5E are provided as one or more examples. Other examples may differ from what is described with respect to FIGS. 5A-5E.

Figure 6:
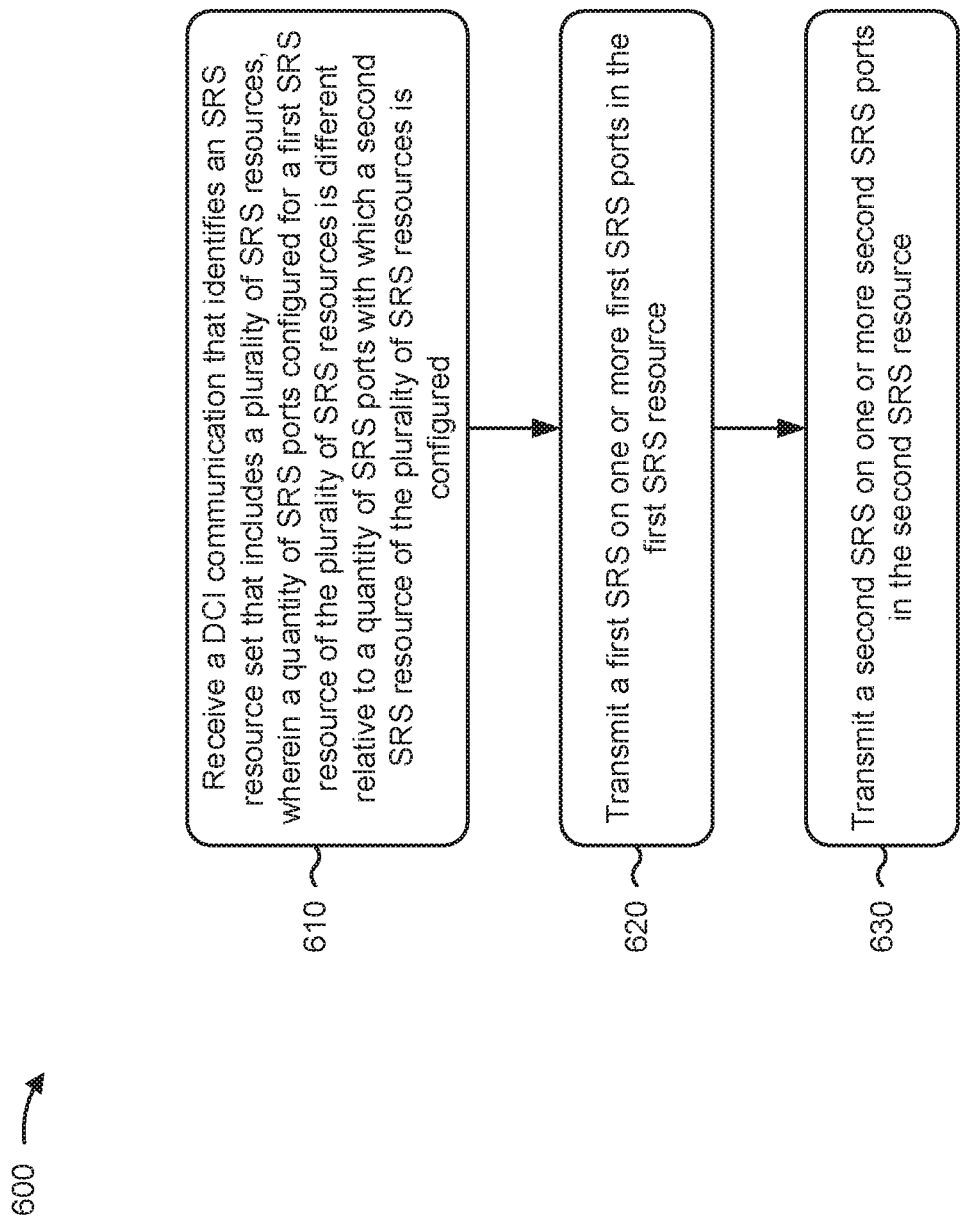
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs operations associated with configuring SRS configurations for supporting virtual and non-virtual port sounding.

As shown in FIG. 6, in some aspects, process 600 may include receiving a DCI communication that identifies an SRS resource set that includes a plurality of SRS resources, wherein a quantity of SRS ports configured for a first SRS resource of the plurality of SRS resources is different relative to a quantity of SRS ports with which a second SRS resource of the plurality of SRS resources is configured (block 610). For example, the UE (e.g., using antenna 252, DEMOD 254, MIMO detector 256, receive processor 258, controller/processor 280, memory 282, and/or the like) may receive a DCI communication that identifies an SRS resource set that includes a plurality of SRS resources, as described above in connection with one or more of FIGS. 3-5E. In some aspects, a quantity of SRS ports configured for a first SRS resource of the plurality of SRS resources is different relative to a quantity of SRS ports with which a second SRS resource of the plurality of SRS resources is configured.

As further shown in FIG. 6, in some aspects, process 600 may include transmitting a first SRS on one or more first SRS ports in the first SRS resource (block 620). For example, the UE (e.g., using controller/processor 280, transmit processor 264, TX MIMO processor 266, MOD 254, antenna 252, and/or the like) may transmit a first SRS on one or more first SRS ports in the first SRS resource, as described above in connection with one or more of FIGS. 3-5E.

As further shown in FIG. 6, in some aspects, process 600 may include transmitting a second SRS on one or more second SRS ports in the second SRS resource (block 630). For example, the UE (e.g., using controller/processor 280, transmit processor 264, TX MIMO processor 266, MOD 254, antenna 252, and/or the like) may transmit a second SRS on one or more second SRS ports in the second SRS resource, as described above in connection with one or more of FIGS. 3-5E.

Process 600 may include additional aspects, such as any single aspect or any combination of aspects described below and/or in connection with one or more other processes described elsewhere herein.

In a first aspect, the one or more first SRS ports are non-virtual SRS ports and the one or more second SRS ports are virtual SRS ports. In a second aspect, alone or in combination with the first aspect, the SRS resource set is included in a plurality of SRS resource sets identified by an SRS configuration, and the plurality of SRS resource sets are indicated as having an SRS resource set with usage set to codebook. In a third aspect, alone or in combination with one or more of the first and second aspects, each SRS resource of the plurality of SRS resources is associated with a same antenna panel. In a fourth aspect, alone or in combination with one or more of the first through third aspects, each SRS resource set of the plurality of SRS resource sets is associated with a respective spatial filter. In a fifth aspect, alone or in combination with one or more of the first through fourth aspects, each SRS resource set of the plurality of SRS resource sets is associated with a respective antenna panel of the UE.

In a sixth aspect, alone or in combination with one or more of the first through fifth aspects, the plurality of SRS resources includes a third SRS resource, and process 600 further comprises transmitting an SRS on one or more SRS ports in the third SRS resource. In a seventh aspect, alone or in combination with one or more of the first through sixth aspects, each SRS resource of the plurality of SRS resources is associated with a different antenna panel. In an eighth aspect, alone or in combination with one or more of the first through seventh aspects, the plurality of SRS resources includes more than two SRS resources, and the DCI communication includes a two-bit indicator that identifies an SRI for the first SRS resource.

In a ninth aspect, alone or in combination with one or more of the first through eighth aspects, the plurality of SRS resources includes a third SRS resource and a fourth SRS resource, and process 600 further comprises transmitting an SRS on one or more SRS ports in the fourth SRS resource. In a tenth aspect, alone or in combination with one or more of the first through ninth aspects, a subset of the plurality of SRS resources is associated with a same antenna panel. In an eleventh aspect, alone or in combination with one or more of the first through tenth aspects, each SRS resource of the plurality of SRS resources is associated with a same spatial filter. In a twelfth aspect, alone or in combination with one or more of the first through eleventh aspects, each SRS resource of the plurality of SRS resources is associated with a different spatial filter.

In a thirteenth aspect, alone or in combination with one or more of the first through twelfth aspects, a subset of the plurality of SRS resources is associated with a same spatial filter.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
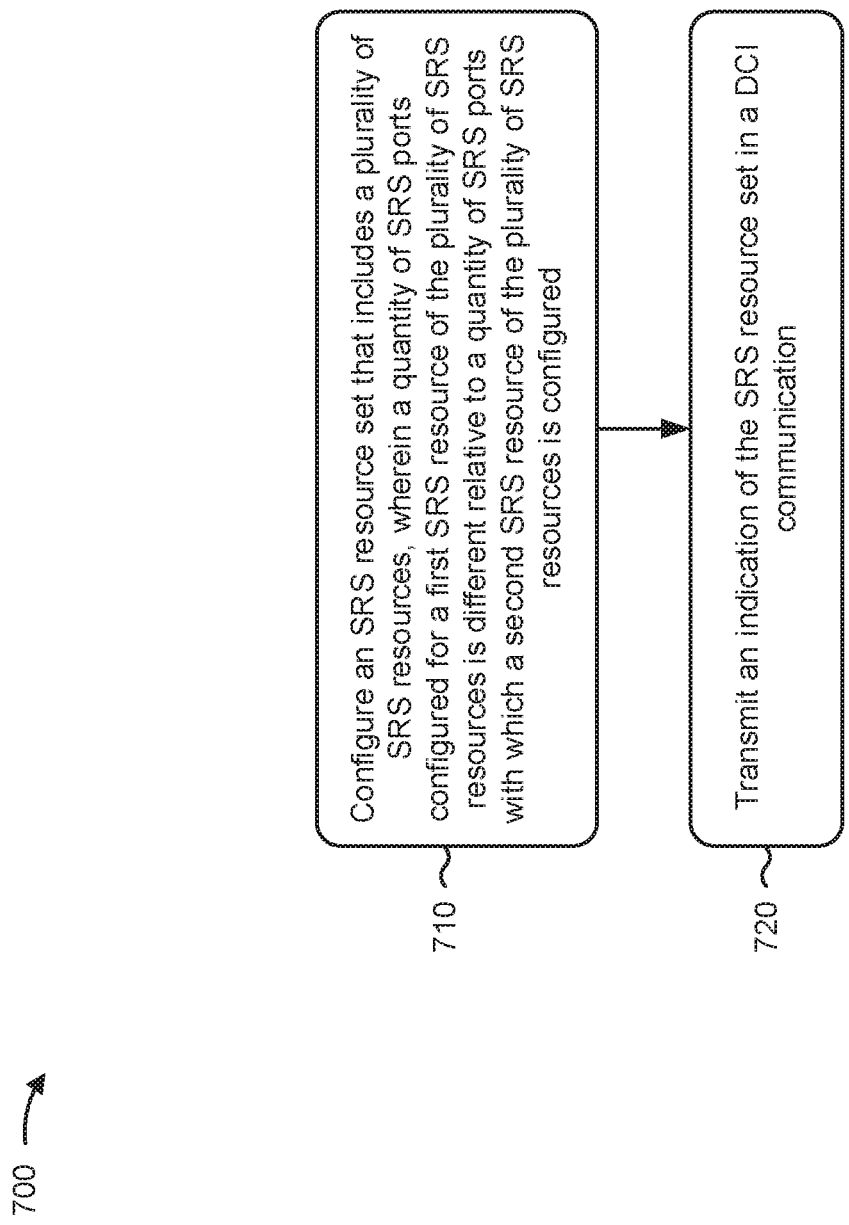
FIG. 7 is a diagram illustrating an example process performed, for example, by a BS, in accordance with various aspects of the present disclosure.

FIG. 7 is a diagram illustrating an example process 700 performed, for example, by a BS, in accordance with various aspects of the present disclosure. Example process 700 is an example where a BS (e.g., BS 110) performs operations associated with configuring SRS configurations for supporting virtual and non-virtual port sounding.

As shown in FIG. 7, in some aspects, process 700 may include configuring an SRS resource set that includes a plurality of SRS resources, wherein a quantity of SRS ports configured for a first SRS resource of the plurality of SRS resources is different relative to a quantity of SRS ports with which a second SRS resource of the plurality of SRS resources is configured (block 710). For example, the BS (e.g., using controller/processor 240, transmit processor 220, TX MIMO processor 230, MOD 232, antenna 234, and/or the like) may configure an SRS resource set that includes a plurality of SRS resources, as described above in connection with one or more of FIGS. 3-5E. In some aspects, a quantity of SRS ports configured for a first SRS resource of the plurality of SRS resources is different relative to a quantity of SRS ports with which a second SRS resource of the plurality of SRS resources is configured.

As further shown in FIG. 7, in some aspects, process 700 may include transmitting an indication of the SRS resource set in a DCI communication (block 720). For example, the BS (e.g., using antenna 234, DEMOD 232, MIMO detector 236, receive processor 238, controller/processor 240, and/or the like) may transmit an indication of the SRS resource set in a DCI communication, as described above in connection with one or more of FIGS. 3-5E.

Process 700 may include additional aspects, such as any single aspect or any combination of aspects described below and/or in connection with one or more other processes described elsewhere herein.

In a first aspect, the one or more first SRS ports are non-virtual SRS ports and the one or more second SRS ports are virtual SRS ports. In a second aspect, alone or in combination with the first aspect, the SRS resource set is included in a plurality of SRS resource sets identified by an SRS configuration, and the plurality of SRS resource sets are indicated as having an SRS resource set with usage set to codebook. In a third aspect, alone or in combination with one or more of the first and second aspects, process 700 further comprises configuring each SRS resource of the plurality of SRS resources to be associated with different antenna panels of a user equipment. In a fourth aspect, alone or in combination with one or more of the first through third aspects, process 700 further comprises configuring each SRS resource set of the plurality of SRS resource sets with a respective spatial filter.

In a fifth aspect, alone or in combination with one or more of the first through fourth aspects, each SRS resource set of the plurality of SRS resource sets is associated with a respective antenna panel of a UE. In a sixth aspect, alone or in combination with one or more of the first through fifth aspects, the plurality of SRS resources includes a third SRS resource, and process 700 further comprises receiving an SRS on one or more third SRS ports in the third SRS resource. In a seventh aspect, alone or in combination with one or more of the first through sixth aspects, process 700 further comprises configuring each SRS resource of the plurality of SRS resources to be associated with a same antenna panel of a user equipment.

In an eighth aspect, alone or in combination with one or more of the first through seventh aspects, the plurality of SRS resources includes more than two SRS resources, and the DCI communication includes a two-bit indicator that identifies an SRI for the first SRS resource. In a ninth aspect, alone or in combination with one or more of the first through eighth aspects, the plurality of SRS resources includes a third SRS resource and a fourth SRS resource, and process 700 further comprises receiving an SRS on one or more fourth SRS ports in the fourth SRS resource. In a tenth aspect, alone or in combination with one or more of the first through ninth aspects, process 700 further comprises configuring a subset of the plurality of SRS resources to be associated with a same antenna panel of a user equipment.

In an eleventh aspect, alone or in combination with one or more of the first through tenth aspects, process 700 further comprises configuring each SRS resource of the plurality of SRS resources with a same spatial filter. In a twelfth aspect, alone or in combination with one or more of the first through eleventh aspects, process 700 further comprises configuring each SRS resource of the plurality of SRS resources with a different spatial filter. In a thirteenth aspect, alone or in combination with one or more of the first through twelfth aspects, process 700 further comprises configuring a subset of the plurality of SRS resources with a same spatial filter.

In fourteenth aspect, alone or in combination with one or more of the first through thirteenth aspects, process 700 further includes receiving a first SRS on one or more first SRS ports in the first SRS resource. In fifteenth aspect, alone or in combination with one or more of the first through fourteenth aspects, process 700 further includes receiving a second SRS on one or more second SRS ports in the second SRS resource.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving a downlink control information (DCI) communication that indicates a sounding reference signal (SRS) resource set that includes a plurality of SRS resources,
        wherein a quantity of SRS ports configured for a first SRS resource of the plurality of SRS resources is different relative to a quantity of SRS ports with which a second SRS resource of the plurality of SRS resources is configured, and
        wherein a first SRS resource set, of the plurality of SRS resources and including the first SRS resource, is associated with a first spatial filter, and a second SRS resource set, of the plurality of SRS resources and including the second SRS resource, is associated with a second spatial filter;
    transmitting a first SRS on one or more first SRS ports in the first SRS resource; and
    transmitting a second SRS on one or more second SRS ports in the second SRS resource.

2. The method of claim 1, wherein a SRS resource, of the plurality of SRS resources and different from the first SRS resource set and the second SRS resource set, is associated with the first spatial filter or the second spatial filter.

3. The method of claim 1, wherein the plurality of SRS resources includes a third SRS resource; and
    wherein the method further comprises:
        transmitting a third SRS on one or more third SRS ports in the third SRS resource.

4. The method of claim 3, wherein the plurality of SRS resources includes a fourth SRS resource; and
    wherein the method further comprises:
        transmitting a fourth SRS on one or more fourth SRS ports in the fourth SRS resource.

5. The method of claim 1, wherein the plurality of SRS resources includes more than two SRS resources; and
    wherein the DCI communication includes a two-bit indicator that identifies an SRS resource indicator (SRI) for the first SRS resource.

6. The method of claim 1, wherein the one or more first SRS ports are non-virtual SRS ports; and
    wherein the one or more second SRS ports are virtual SRS ports.

7. The method of claim 1, wherein the first SRS resource set and the second SRS resource set are included in a plurality of SRS resource sets identified by an SRS configuration associated with at least one of the first SRS resource set or the second SRS resource set; and
    wherein the plurality of SRS resource sets are indicated as having an SRS resource set with usage set to codebook.

8. The method of claim 7, wherein each SRS resource set of the plurality of SRS resource sets is associated with a respective spatial filter, including the first SRS resource set and the second SRS resource being associated with the first spatial filter and the second spatial filter, respectively.

9. The method of claim 7, wherein each SRS resource set of the plurality of SRS resource sets is associated with a respective antenna panel of the UE.

10. The method of claim 1, wherein each SRS resource of the plurality of SRS resources is associated with a different spatial filter.

11. The method of claim 1, wherein a subset of the plurality of SRS resources is associated with a same antenna panel.

12. A method of wireless communication performed by a base station (BS), comprising:
configuring a sounding reference signal (SRS) resource set that includes a plurality of SRS resources,
wherein a quantity of SRS ports configured for a first SRS resource of the plurality of SRS resources is different relative to a quantity of SRS ports with which a second SRS resource of the plurality of SRS resources is configured, and
wherein a first SRS resource set, of the plurality of SRS resources and including first SRS resource, is associated with a first spatial filter, and a second SRS resource set, of the plurality of SRS resources and including the second SRS resource, is associated with a second spatial filter; and
transmitting an indication of the SRS resource set in a downlink control information (DCI) communication.

13. The method of claim 12, further comprising:
configuring a third SRS resource, of the plurality of SRS resources and different from the first SRS resource set and the second SRS resource set, with the first spatial filter or the second SRS resource set.

14. The method of claim 12, wherein the plurality of SRS resources includes a third SRS resource; and
wherein the method further comprises:
receiving an SRS on one or more SRS ports in the third SRS resource.

15. The method of claim 12, wherein the plurality of SRS resources includes a third SRS resource and a fourth SRS resource; and
wherein the method further comprises:
receiving an SRS on one or more SRS ports in the fourth SRS resource.

16. The method of claim 12, wherein the plurality of SRS resources includes more than two SRS resources; and
wherein the DCI communication includes a two-bit indicator that identifies an SRS resource indicator (SRI) for the first SRS resource.

17. The method of claim 12, wherein the quantity of SRS ports configured for the first SRS resource are non-virtual SRS ports; and
wherein the quantity of SRS ports configured for the second SRS resource are virtual SRS ports.

18. The method of claim 12, wherein the first SRS resource set and the second SRS resource set are included in a plurality of SRS resource sets identified by an SRS configuration associated with at least one of the first SRS resource set or the second SRS resource set; and
wherein the plurality of SRS resource sets are indicated as having an SRS resource set with usage set to codebook.

19. The method of claim 18, further comprising:
configuring the first SRS resource set and the second SRS resource set with the first spatial filter and the second spatial filter, respectively.

20. The method of claim 18, wherein each SRS resource set of the plurality of SRS resource sets is associated with a respective antenna panel of a user equipment (UE).

21. The method of claim 12, further comprising:
configuring each SRS resource of the plurality of SRS resources with a different spatial filter.

22. The method of claim 12, further comprising:
configuring a subset of the plurality of SRS resources to be associated with a same antenna panel of a user equipment.

23. A user equipment (UE) for wireless communication, comprising:
a memory; and
one or more processors coupled to the memory, the one or more processors configured to:
receive a downlink control information (DCI) communication that identifies a sounding reference signal (SRS) resource set that includes a plurality of SRS resources,
wherein a quantity of SRS ports configured for a first SRS resource of the plurality of SRS resources is different relative to a quantity of SRS ports with which a second SRS resource of the plurality of SRS resources is configured, and
wherein a first SRS resource set, of the plurality of SRS resources and including the first SRS resource, is associated with a first spatial filter, and a second SRS resource set, of the plurality of SRS resources and including the second SRS resource, is associated with a second spatial filter;
transmit a first SRS on one or more first SRS ports in the first SRS resource; and
transmit a second SRS on one or more second SRS ports in the second SRS resource.

24. The UE of claim 23, wherein a SRS resource, of the plurality of SRS resources and different from the first SRS resource set and the second SRS resource set, is associated with the first spatial filter or the second spatial filter.

25. The UE of claim 23, wherein the plurality of SRS resources includes a third SRS resource and a fourth SRS resource.

26. The UE of claim 25, wherein the one or more processors are further configured to perform at least one of:
transmit a third SRS on one or more third SRS ports in the third SRS resource; or
transmit a fourth SRS on one or more fourth SRS ports in the fourth SRS resource.

27. The UE of claim 23, wherein the plurality of SRS resources includes more than two SRS resources; and
wherein an SRS configuration, associated with at least one of the first SRS resource set or the second SRS resource set, identifies a respective SRS resource indicator (SRI) for each SRS resource of the plurality of SRS resources.

28. The UE of claim 23, wherein the respective SRS for each SRS resource is indicated by a plurality of bits in an SRS configuration associated with at least one of the first SRS resource set or the second SRS resource set.

29. A base station (BS) for wireless communication, comprising:
a memory; and
one or more processors coupled to the memory, the one or more processors configured to:
configure a sounding reference signal (SRS) resource set that includes a plurality of SRS resources,
wherein a quantity of SRS ports configured for a first SRS resource of the plurality of SRS resources is different relative to a quantity of SRS ports with which a second SRS resource of the plurality of SRS resources is configured, and
wherein a first SRS resource set, of the plurality of SRS resources and including the first SRS resource, is associated with a first spatial filter, and a second SRS resource set, of the plurality of SRS resources and including the second SRS resource, is associated with a second spatial filter; and transmit an indication of the SRS resource set in a downlink control information (DCI) communication.

30. The BS of claim 29, wherein a SRS resource, of the plurality of SRS resources and different from the first SRS resource set and the second SRS resource set, is associated with the first spatial filter or the second spatial filter.

* * * * *